Patented Aug. 12, 1952

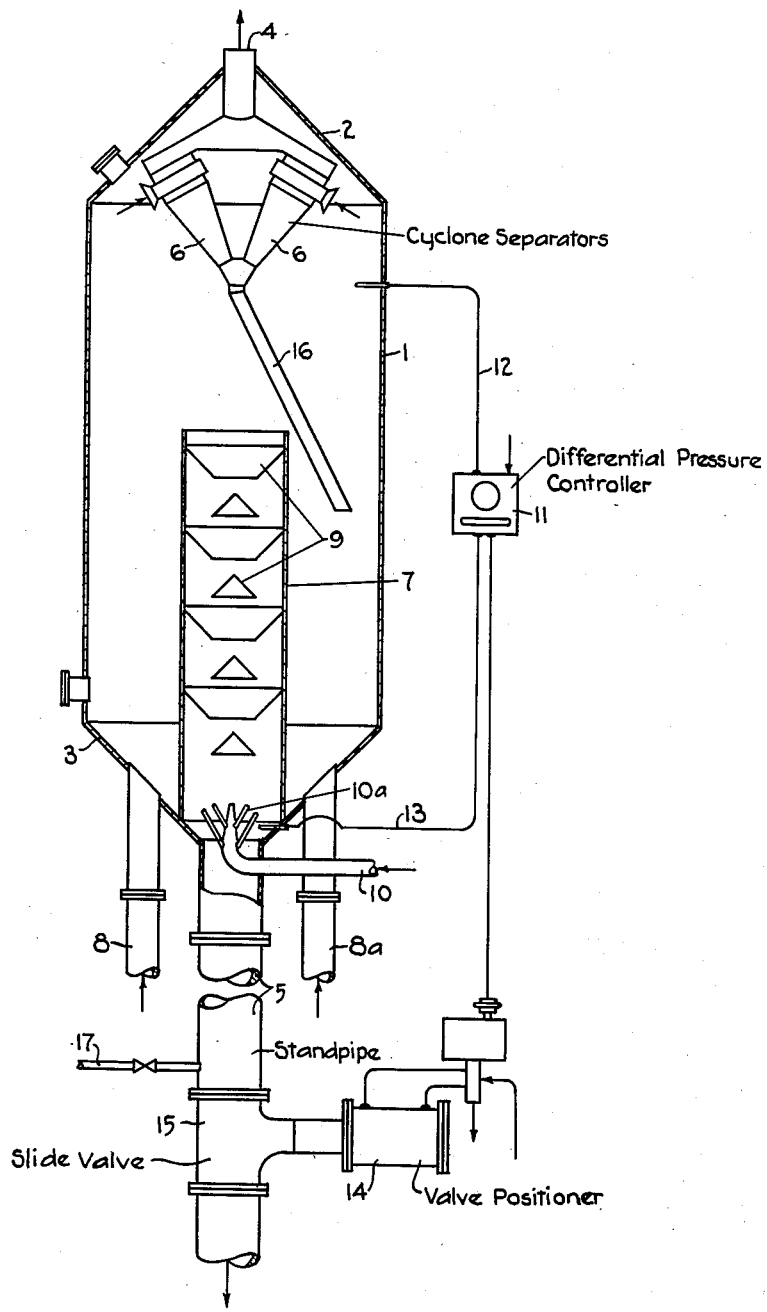

2,606,863

UNITED STATES PATENT OFFICE 2,606,863

PROCESS AND APPARATUS FOR THE CONVERSION OF HYDROCARBONS AND THE STRIPPING OF VAPORIZABLE HYDROCARBONS FROM THE FOULED CATALYST

Charles A. Rehbein, New York, N. Y., assignor to Shell Development Company, San Francisco, Calif., a corporation of Delaware Application May 14, 1945, Serial No. 593,625

7 Claims. (Cl. 196—52)

This invention relates to an improved method for effecting catalytic conversions with finely divided catalysts and apparatus therefor. More particularly the invention relates to a method of operation of a fluid catalyst converter of the bottom draw-off type. A particular aspect of the invention relates to the so-called stripping step involved in carrying out conversions in such a system.

Many catalytic conversions or treatments may be carried out most effectively by employing the catalyst in a finely divided or powdered state. This is particularly the case in such processes where it is necessary or advantageous to regenerate the catalyst after short periods of use, since by employing the catalyst in a finely divided or powdered state it may be relatively easily cycled through the reaction zone and through a separate regeneration zone. Some methods have been proposed wherein the powdered catalyst is employed suspended in the gaseous or vaporous reactants. However, such methods require low catalyst concentrations and afford limited contact times and are relatively inefficient for most purposes. The more common method is to employ the catalyst in a so-called fluidized or pseudo-liquid state in which state it may be cycled about in the plant much as if it were a true liquid. Such a system using a finely divided catalyst in a pseudo-liquid or fluidized state is called a fluid catalyst system.

There are at present two main types of fluid catalyst systems and several modifications of each. In one of the systems the conversion is effected in a so-called up-flow or top draw-off reactor. In this system the vaporous product leaves the reactor at the top carrying in suspension an amount of the finely divided catalyst substantially equivalent to the amount continuously supplied to the reactor with the reactant vapors. The bulk of the suspended catalyst is separated in a separate chamber or apparatus. In the other main system the conversion is effected in a so-called down-flow or bottom draw-off reactor. In this system the reactant vapors with a portion of the finely divided catalyst are passed into the bottom of a reaction zone provided with a bed of the finely divided catalyst in a relatively dense fluidized or pseudo-liquid state. The product vapors pass out of the top of the reactor substantially free of catalyst. An amount of catalyst substantially equivalent to the amount introduced with the feed is continuously withdrawn from the fluid catalyst phase through the bottom of the reactor.

This second type of system is superior to the up-flow type of system in several important respects and is generally preferred. The process of the invention relates to systems of this latter type.

In this system the partially spent catalyst cycled to the regeneration zone normally tends to carry with it large amounts of the reactant and/or product. In order to prevent excessive losses, the catalyst is given a so-called stripping treatment to remove the major part of the mixed or occluded reactant and product vapors before being cycled to the regenerator. In the bottom draw-off reactors the stripping is effected by passing steam counter-current to the catalyst being withdrawn. The steam or other stripping gas is introduced below the point of introduction of the reactant vapors; the lowest part of the reactor between these two points of injection is called the stripping section. In some cases vertical baffles, skirts, and/or other internal arrangements are provided to more or less separate or isolate this stripping section and to increase the efficiency of the stripping action. The material undergoing stripping is in the fluidized or pseudo-liquid phase. The stripping gas, it is seen, passes up through the catalyst bed with the reactant vapors. This system is suitable for many conversions such as catalytic cracking and related conversions of hydrocarbon materials with clay-type cracking catalysts, but is usually not suitable for such reactions as catalytic reforming, dehydrogenation, dehydrocyclization, hydrofining and the like with dehydrogenating metal oxide catalysts, primarily because of the fact that most of the catalysts used in such processes are poisoned by water vapor.

It has been found that in such systems considerably improved results may be obtained if the apparatus and operating conditions are arranged to effect the stripping of the catalyst while in a light or disperse rather than in the conventional dense or pseudo-liquid phase. This is of considerable practical importance. For example, in a typical fluid catalyst catalytic cracking plant of 15,000 barrels per day rated capacity, about 13,000 to 18,000 pounds per hour of carbon is burned in the regenerator. In the existing plants the throughput is limited by the carbon burning capacity of the regenerator. If the amount of carbon to be burned can be reduced by as little as 0.5% based on the feed, this means a large advantage. Such a reduction is possible when employing the method of the present invention. Also, by applying the process of the invention, reactors of the bottom draw-off type can be used with catalysts which are sensitive to water vapor. This is also of considerable advantage.

The operation of the present invention will be described in connection with the catalytic cracking of a hydrocarbon oil with a clay-type cracking catalyst such, for example, as a synthetic silica-alumina cracking catalyst or one of the activated clay catalysts sold under the trade name of "Filtrol." It will be understood, however, that the process of the invention may be applied to various other catalytic conversions with these or with other finely divided catalysts. To aid in the description, reference is had to the attached drawing wherein a bottom draw-off fluid catalyst reactor designed to operate in accordance with the process of the invention is shown. It will be appreciated that for clearness and simplicity only the more important parts of the converter are shown. Such auxiliary things as vents, gages, thermocouple wells, aeration lines, valves, insulation, supporting lugs, etc. as have no bearing on the invention have been omitted.

The reactor, as far as it is conventional comprises the outer cylindrical shell 1 mounted vertically and having conical ends 2 and 3. The shell is preferably somewhat elongated and of large horizontal cross section with respect to the various inlet pipes. An outlet 4 for vapors is provided in the upper cone and an outlet line 5 for spent catalyst is provided in the lower cone. Line 5 is a standpipe or so-called catastat which is normally full of fluidized catalyst to maintain a predetermined minimum "hydrostatic" head and prevent blow-back up into the reactor. It is preferably provided with suitable aeration lines such as line 17. In the upper section of the reactor (in the so-called disengaging space) there is one or more cyclone separators indicated diagrammatically at 6. These cyclones are usually of either the "multi-clone" or Buell type. The discharge legs of the cyclones are arranged to dip below the upper level of the fluid catalyst phase (i. e. below the top of cylinder 7) either singly, or combined, as shown.

The reactor differs from the conventional reactors in one or more of the following particulars. The stripping section, instead of being in the lower cone of the reactor, extends up to the surface of the fluid catalyst phase (about the mid-height of the reactor) and is separated from the reaction zone by a suitable vertical wall or partition such as the elongated vertically disposed open cylinder 7. The inlets 8 and 8a for the reactant vapors and fresh catalyst are situated in the bottom of the reactor to the side of the stripping section (cylinder 7) and thus discharge directly into the reaction zone (i. e. the space between the shell and cylinder 7). The stripping section (interior of cylinder 7) is preferably provided with suitable baffles or deflecting plates 9 which are preferably inclined at an angle which is greater than the angle of repose of the catalyst. Means for injecting stripping steam into the lower section of the stripping zone are provided. This may be a distributing plate, nozzle, or other equivalent means. In the apparatus illustrated, the stripping steam enters via line 10 ending in a distributing nozzle 10a placed at the bottom of the stripping section just above the standpipe. A differential pressure controller device 11 is arranged to operate on the differential pressure between the disengaging space in the upper section of the reactor and a point at or near the bottom of the stripping section. The pressures at these points are transferred to the instrument by lines 12 and 13, respectively. The differential pressure controller 11 operates a valve positioner 14 which in turn controls the setting of a slide valve 15 in response to changes in the differential pressure.

The operation of the process and apparatus are as follows: The oil vapor or other reactant vapor or mixture of vapors to be treated and a certain amount of finely divided catalyst (preferably passing a 100-mesh screen) are introduced into the bottom of the reactor by inlets 8 and 8a. The rate of introduction of reactant vapor or total gas via lines 8 and 8a is adjusted in the usual manner with respect to the cross section of the reaction zone, the catalyst density, the degree of fineness of the catalyst, etc. to afford a relatively dense fluidized or pseudo-liquid catalyst phase or bed in the lower section of the reactor up to the top of cylinder 7. The gas or vapor bubbles up through the bed of fluidized catalyst and discharges into the disengaging space. The vapor then passes through the cyclone separators 6 and out through the outlet 4. The small amount of catalyst separated from the vapors by the cyclones 6 returns by gravity to the catalyst bed by line 16. The fluid catalyst bed overflows into the stripping section in the manner of a liquid flowing over a weir. The catalyst passes downward over the baffle plates countercurrent to the up-rising stream of stripping steam and finally passes into the standpipe 5. The catalyst in the standpipe 5 is in a fluidized or pseudo-liquid state and must be so in order to provide the desired "hydrostatic" head. Steam or other aerating gas may be added at one or more points along the length of the standpipe to avoid settling of the catalyst into a hard mass. An inlet for such gas is indicated at 17. An important aspect of the process of the invention is that the level of the fluidized or pseudo-liquid catalyst phase is maintained below the top of cylinder 7 and preferably at a low point near the bottom of the stripping section or the top of the standpipe at or near the point of introduction of the stripping steam. This is controlled by the differential pressure controller, valve positioner and slide valve, just described. As the pressure difference between the points at the bottom of the stripping section and the disengaging space of the reactor increases due to the fluid catalyst phase rising in cylinder 7, the differential pressure controller sets the valve positioner 14 in operation to open the slide valve 15 somewhat and thereby withdraw catalyst from the standpipe at a faster rate and re-establish the level of the fluid catalyst phase at the desired level. Thus, the catalyst undergoing stripping in cylinder 7 is not in the fluid or pseudo-liquid phase, but is in a disperse phase. The catalyst merely falls through the rising steam. If desired, the fluid catalyst level can be raised somewhat in the cylinder 7 (for instance, to one-fourth, or one-third, or even one-half the height of cylinder 7), in which case the stripping action will take place partially in the disperse phase and partially in the fluid phase. This modification affords less efficient stripping, but since it allows a somewhat shorter standpipe it may be advantageous in some cases.

While the described method of operation may advantageously be applied in carrying out various conversions and/or treatments with various finely divided contact agents, it is particularly advantageous in such cases where the ratio of catalyst to reactant supplied to the reactor is relatively high, for example, greater than 1:1 by weight.

The regeneration of finely divided catalyst in fluid catalyst systems is analogous to catalytic cracking and other conversions, air being the reactant vapor. Thus, the system and processes of the invention are also applicable for catalyst regeneration.

In the process of the invention the steam used for stripping passes up through the disperse catalyst phase in the stripping zone and unites with the reactant vapors above the level of the fluid catalyst bed. The stripping steam therefore does not contact the main portion of the catalyst bed. This is advantageous in several respects.

While the invention has been described in connection with the use of steam as the stripping agent, it will be appreciated that other stripping gases such as air, flue gas, hydrocarbon vapor, hydrogen, carbon dioxide, or the like, may be employed in certain instances, either with or in place of the steam.

I claim as my invention:

1. Process for carrying out a reaction with a finely divided catalyst which comprises continuously passing the reactant vapors with finely divided catalyst into the bottom of a bed of finely divided catalyst maintained in a so-called fluidized or pseudo liquid state and maintained under reaction conditions, continuously withdrawing finely divided catalyst from the very top of said pseudo liquid bed of catalyst by overflow over a weir directly into a standpipe, continuously introducing a stripping gas into said standpipe to strip the catalyst in the upper section thereof, continuously withdrawing pseudo liquid catalyst from the bottom of said standpipe, and maintaining the upper level of the pseudo liquid phase in said standpipe below the level of said pseudo liquid bed so that the height of the said pseudo liquid bed is constant and fixed by said weir regardless of the rate of withdrawal of catalyst from said standpipe and the finely divided catalyst overflows from the top of said pseudo liquid bed into said standpipe at a rate which is independent of the rate of withdrawal of pseudo liquid catalyst from the bottom of said standpipe, whereby the finely divided catalyst in entering the top of the standpipe falls through said stripping gas.

2. Process for carrying out a reaction with a finely divided catalyst which comprises continuously passing the reactant vapors with finely divided catalyst into the bottom of a bed of finely divided catalyst maintained in a so-called fluidized or pseudo liquid state and maintained under reaction conditions, continuously withdrawing finely divided catalyst from the very top of said pseudo liquid bed of catalyst by overflow over a weir directly into a standpipe, continuously introducing steam into said standpipe to strip the catalyst in the upper section thereof, continuously withdrawing pseudo liquid catalyst from the bottom of said standpipe, and maintaining the upper level of the pseudo liquid phase in said standpipe below the level of said pseudo liquid bed so that the height of the said pseudo liquid bed is constant and fixed by said weir regardless of the rate of withdrawal of catalyst from said standpipe and the finely divided catalyst overflows from the top of said pseudo liquid bed into said standpipe at a rate which is independent of the rate of withdrawal of pseudo liquid catalyst from the bottom of said standpipe whereby the finely divided catalyst in entering the top of the standpipe falls through said stripping gas.

3. In a process for carrying out a reaction with a finely divided catalyst, the improvement which comprises continuously passing reactant vapors under reaction conditions upwardly through a bed of finely divided catalyst maintained in a so-called fluidized or pseudo liquid state and constituting a reaction zone of constant volume, continuously introducing finely divided catalyst into said bed thereby causing the pseudo liquid catalyst to overflow and spill from the top of said bed into a stripping zone, continuously introducing a stripping gas at a low point in said stripping zone and passing the same up through said zone, continuously withdrawing catalyst in the pseudo liquid state from the bottom of said stripping zone, and maintaining the upper level of the pseudo liquid catalyst in said stripping zone below the level of the top of said pseudo liquid bed constituting the reaction zone so that the catalyst overflowing from the top of the pseudo liquid bed defining the reaction zone falls to the level of the pseudo liquid catalyst in said stripping zone countercurrent to and through said stripping gas.

4. In a process for the catalytic cracking of a hydrocarbon oil with a finely divided cracking catalyst, the improvement which comprises continuously passing hydrocarbon oil vapors under cracking conditions upwardly through a bed of finely divided cracking catalyst maintained in a so-called fluidized or pseudo liquid state and constituting a reaction zone of constant volume, continuously introducing finely divided cracking catalyst into said bed thereby causing the pseudo liquid catalyst to overflow and spill from the top of said bed into a stripping zone, continuously introducing steam at a low point in said stripping zone and passing the same up through said zone, continuously withdrawing catalyst in the pseudo liquid state from the bottom of said stripping zone, and maintaining the upper level of the pseudo liquid catalyst in said stripping zone below the level of the top of said pseudo liquid bed constituting the reaction zone so that the catalyst overflowing from the top of the pseudo liquid bed defining the reaction zone falls to the level of the pseudo liquid catalyst in said stripping zone countercurrent to and through said steam.

5. A fluid catalyst reactor of the type described which comprises an elongated vertically disposed cylindrical reaction chamber of substantial horizontal cross section, means for introduction of reactant vapors and catalyst into the bottom of said reaction chamber, means for withdrawing reactant vapors from the top of said reaction chamber, an elongated vertically disposed stripping chamber within said reaction chamber extending into said reaction chamber from the bottom up to approximately the mid-height of said reaction chamber, said stripping chamber being open and communicating with the reaction chamber at its top and communicating with a standpipe at its bottom, means for injecting a stripping gas into the bottom of said stripping chamber, valve with valve positioning means in said standpipe, means for automatically controlling said valve positioning means in accordance with the differential pressure between two points, means responsive to variation in pressure connecting said controlling means to a point within the interior of the reactor above the top of said stripping chamber and to a point at substantially the bottom of said stripping chamber.

6. A fluid catalyst reactor of the type described which comprises a reaction chamber of relatively large horizontal cross section, inlet for the introduction of reactant vapors and catalyst of relatively small cross section at the bottom of said reaction chamber, outlet for withdrawing reactant vapors from the top of said reaction chamber, an elongated vertically disposed stripping chamber within said reaction chamber extending into said reaction chamber from the bottom up to approximately the mid-height of said reaction chamber, said stripping chamber being open and communicating with the reaction chamber at its top and communicating with a standpipe at its bottom, means for injecting a stripping gas into the bottom of said stripping chamber, valve with valve positioning means in said standpipe, means for automatically controlling said valve positioning means in accordance with the differential pressure between two points, means responsive to variation in pressure connecting said controlling means to a point within the interior of the reactor above the top of said stripping chamber and to a point at substantially the bottom of said stripping chamber.

7. Apparatus according to claim 6 in which the stripping chamber is provided with downwardly inclined baffles.

CHARLES A. REHBEIN.

REFERENCES CITED

The following references are of record in the file of this patent:

UNITED STATES PATENTS

| Number | Name | Date |
|---|---|---|
| 2,326,705 | Thiele et al. | Aug. 10, 1943 |
| 2,341,193 | Scheineman | Feb. 8, 1944 |
| 2,391,336 | Ogorzaly | Dec. 18, 1945 |
| 2,399,050 | Martin | Apr. 23, 1946 |
| 2,414,002 | Thomas et al. | Jan. 7, 1947 |
| 2,440,620 | Taff | Apr. 27, 1948 |